No. 634,409. Patented Oct. 3, 1899.
S. FULLER.
HAND WEEDER.
(Application filed Dec. 23, 1898.)
(No Model.)
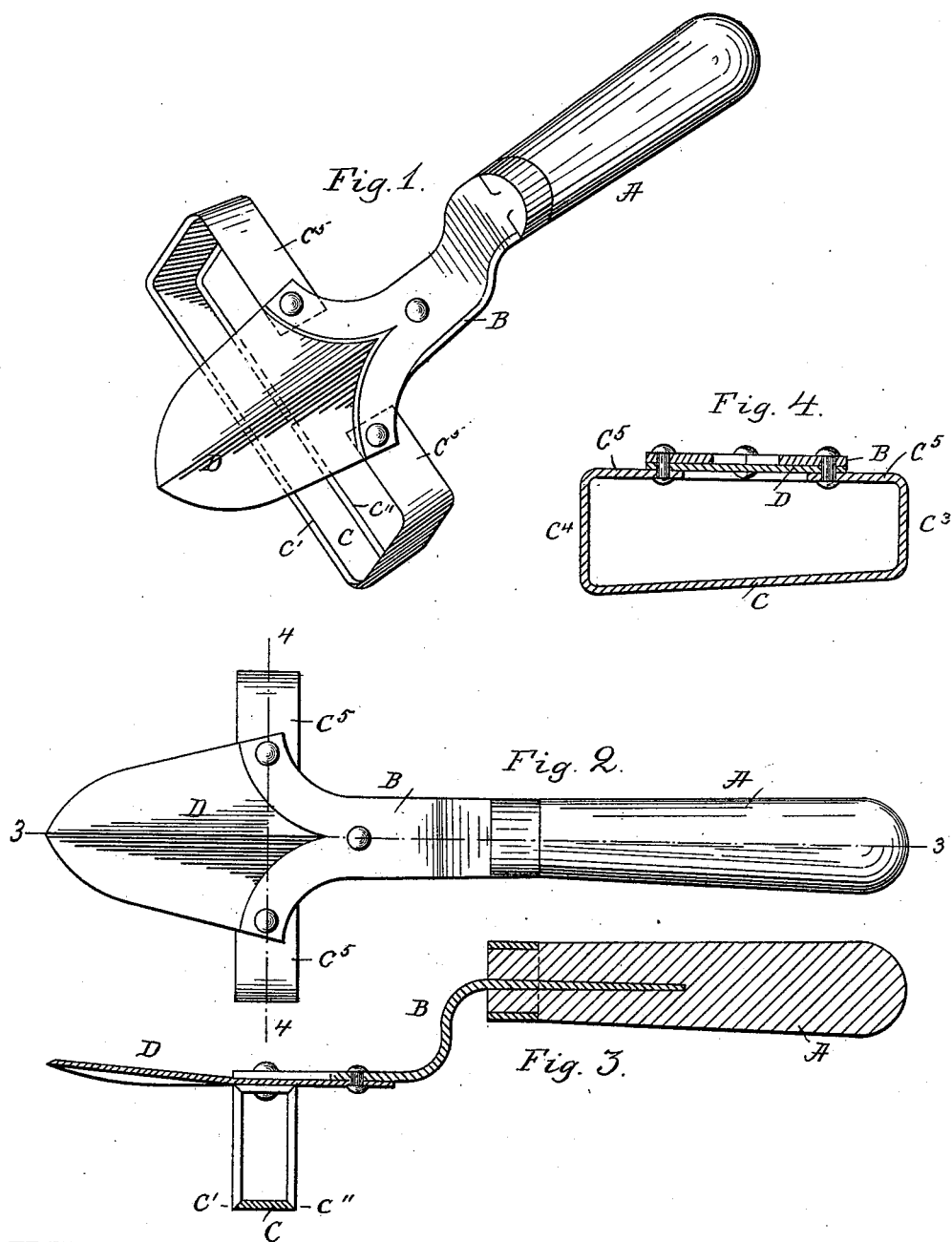

UNITED STATES PATENT OFFICE.

SOLOMON FULLER, OF DANVERS, MASSACHUSETTS.

HAND-WEEDER.

SPECIFICATION forming part of Letters Patent No. 634,409, dated October 3, 1899.

Application filed December 23, 1898. Serial No. 700,188. (No model.)

*To all whom it may concern:*

Be it known that I, SOLOMON FULLER, a citizen of the United States, residing at Danvers, in the county of Essex and State of Massachusetts, have invented new and useful Improvements in Hand-Weeders, of which the following is a specification.

This invention relates to improvements in hand-weeders; and it is carried out as follows, reference being had to the accompanying drawings, wherein—

Figure 1 represents a perspective view of the invention. Fig. 2 represents a top plan view of the same. Fig. 3 represents a central longitudinal section on the line 3 3 shown in Fig. 2, and Fig. 4 represents a cross-section on the line 4 4 shown in Fig. 2.

Similar letters refer to similar parts wherever they occur on the different parts of the drawings.

In the drawings, A represents a handle to which is secured a metal shank B, to the forward end of which is secured the cutter-blade C, which is made skeleton form of a rectangular or nearly so cross-section, as shown, said cutter-blade having beveled cutting edges on its circumference at its front and rear portions, as shown, respectively, at $C'$ and $C''$. As shown, the ends of the shank B are forked and the ends of the cutter-blade C are riveted thereto. The rear end of the trowel D is disposed between the forked ends of the shank and is riveted thereto by the same rivets that attach the cutter-blade to said shank. As shown, the cutter-blade is made of a single piece of wrought-steel, having a bottom part C, upright side parts $C^3$ and $C^4$, and top parts $C^5 C^5$, which are approximately parallel with the bottom part C, and the entire blade from one end to the other is sharpened on both opposite edges. As shown most clearly in Fig. 3, the shank B is bent at a right angle intermediate of its ends, whereby the handle is raised above the plane of the implement, thereby preventing the operator's hand from coming in contact with the soil.

In practice I prefer to make the cutter-blade somewhat narrower at one end, as shown at $C^3$ in Fig. 4, as compared with the opposite end $C^4$, so as to permit such narrow end to be used in weeding plants that may be in close proximity to each other.

It will be noticed that by the skeleton form of the cutter-blade I am enabled to use either the elongated bottom portion or under side or the end portions for weeding purposes, according to the nature or location of the plants that are to be weeded.

By having the cutter-blade provided with beveled cutting edges both at the front and rear the weeding-tool may be used in two directions—namely, by pushing and pulling, as circumstances may require.

In practice I prefer to secure to the upper part of the hand-weeder and its shank a forwardly-projecting trowel D, as shown, which may be used for digging purposes in setting out plants or for other similar purposes, thus combining in one and the same tool a weeder and a trowel by which the utility and efficiency of the tool are materially increased.

What I wish to secure by Letters Patent and claim is—

1. In a hand weeding implement, the combination with a suitable handle, of a flat blade bent into approximately rectangular shape and attached at its ends to said handle, said blade having opposite cutting edges formed throughout its length, substantially as described.

2. In a hand weeding implement, the combination with a suitable handle, of a flat blade bent into trapezoidal shape, whereby the implement is made wider at one end than at the other, and attached at its ends to said handle, said blade having opposite cutting edges formed throughout its length, substantially as described.

3. In a hand weeding implement, the combination with a metallic shank forked at one end and bent at a right angle intermediate of its ends, of a flat blade bent into trapezoidal shape and attached at its ends to the forked ends of the shank, and a trowel riveted between said forked ends, substantially as described.

In testimony whereof I have hereunto set my hand in presence of two subscribing witnesses.

SOLOMON FULLER.

Witnesses:
ALBAN ANDRÉN,
KARL A. ANDRÉN.